(12) United States Patent
Tanaka (10) Patent No.: US 11,349,428 B2
(45) Date of Patent: May 31, 2022

(54) CONTROL APPARATUS, VEHICLE SYSTEM, AND CONTROL METHOD

(71) Applicant: HONDA MOTOR CO., LTD., Tokyo (JP)

(72) Inventor: Masaki Tanaka, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/026,338

(22) Filed: Sep. 21, 2020

(65) Prior Publication Data

US 2021/0091702 A1 Mar. 25, 2021

(30) Foreign Application Priority Data

Sep. 25, 2019 (JP) .............................. JP2019-173977

(51) Int. Cl.
*H02P 1/30* (2006.01)
*H02P 27/08* (2006.01)
*B60L 53/20* (2019.01)

(52) U.S. Cl.
CPC ............ *H02P 27/085* (2013.01); *B60L 53/20* (2019.02); *B60L 2240/421* (2013.01); *B60L 2240/423* (2013.01); *B60L 2240/427* (2013.01); *H02P 2209/095* (2013.01)

(58) Field of Classification Search
CPC .. H02P 27/08; H02P 27/085; H02P 2209/095; H02P 2209/13; H02P 23/027; H02P 23/04; H02P 27/06; H02P 27/04; B60L 53/20; B60L 2240/427; B60L 2240/421; B60L 2240/423

See application file for complete search history.

(56) References Cited

FOREIGN PATENT DOCUMENTS

| | | | |
|---|---|---|---|
| JP | 10-234199 | 9/1998 | |
| JP | 2003-189700 | 7/2003 | |
| JP | 2007-181400 | 7/2007 | |
| JP | 2009-100548 | 5/2009 | |
| JP | 2017060367 A | * 3/2017 | .............. H02P 27/06 |

OTHER PUBLICATIONS

Japanese Office Action for Japanese Patent Application No. 2019-173977 dated Jun. 29, 2021.

* cited by examiner

*Primary Examiner* — Karen Masih
(74) *Attorney, Agent, or Firm* — Amin, Turocy & Watson, LLP (57) ABSTRACT

A control apparatus controls an inverter which outputs electric power to an electric motor. The control apparatus determines which one of a one-pulse control and a pulse-width modulation control is employed as a control method of the inverter in accordance with a predetermined condition based on an electric motor drive torque of the electric motor, a rotation number of the electric motor, and a DC voltage of the electric motor.

10 Claims, 4 Drawing Sheets

CONTROL APPARATUS, VEHICLE SYSTEM, AND CONTROL METHOD

CROSS-REFERENCE TO RELATED APPLICATION

Priority is claimed on Japanese Patent Application No. 2019-173977, filed on Sep. 25, 2019, the contents of which are incorporated herein by reference.

BACKGROUND

Field of the Invention

The present invention relates to a control apparatus, a vehicle system, and a control method.

Background

In the related art, techniques relating to a drive control of an electric vehicle have been known (for example, refer to Japanese Unexamined Patent Application, First Publication No. 2009-100548).

SUMMARY

The above-described electric vehicle according to the related art performs a control using a synchronous one-pulse control mode in a control of an inverter circuit for driving a motor.

However, in the electric vehicle according to the related art, there is a problem that when the synchronous one-pulse control mode is used, a noise, a vibration, and an overall efficiency of the motor are degraded.

An object of an aspect of the present invention is to provide a control apparatus capable of preventing degradations of a noise, a vibration, and an overall efficiency of a motor.

A control apparatus according to a first aspect of the present invention is a control apparatus that controls an inverter which outputs electric power to an electric motor, wherein the control apparatus determines which one of a one-pulse control and a pulse-width modulation control is employed as a control method of the inverter in accordance with a predetermined condition based on an electric motor drive torque of the electric motor, a rotation number of the electric motor, and a DC voltage of the electric motor.

As a second aspect of the present invention, the control apparatus according to the first aspect may determine whether phase sensor error information is calculable based on sensor learning information and may use the phase sensor error information for a second predetermined condition.

As a third aspect of the present invention, the control apparatus according to the first or second aspect may determine which one of the one-pulse control and the pulse-width modulation control is employed based on a second predetermined condition using sensor learning information.

As a fourth aspect of the present invention, the control apparatus according to any one of the first to third aspects may calculate a drive efficiency based on the electric motor drive torque, the rotation number, and the DC voltage and may use the drive efficiency for the predetermined condition.

As a fifth aspect of the present invention, the control apparatus according to any one of the first to fourth aspects may calculate a current value at a time of the one-pulse control based on the electric motor drive torque, the rotation number, and the DC voltage and may use the current value for the predetermined condition.

As a sixth aspect of the present invention, the control apparatus according to any one of the first to fifth aspects may calculate a noise value at a time of the one-pulse control based on the electric motor drive torque, the rotation number, and the DC voltage and may use the noise value for the predetermined condition.

A seventh aspect of the present invention is a vehicle system including: the control apparatus according to any one of the first to sixth aspects; and a drive wheel that is driven by the control apparatus.

A control method according to an eighth aspect of the present invention includes: controlling an inverter which outputs electric power to an electric motor; and determining which one of a one-pulse control and a pulse-width modulation control is employed as a control method of the inverter in accordance with a predetermined condition based on an electric motor drive torque of the electric motor, a rotation number of the electric motor, and a DC voltage of the electric motor.

According to the first to eighth aspects, it is possible to provide a control apparatus capable of preventing a noise and a vibration of a motor.

DESCRIPTION OF THE EMBODIMENTS

Embodiment

Hereinafter, an embodiment of the present invention will be described with reference to the drawings.

Figure 1:
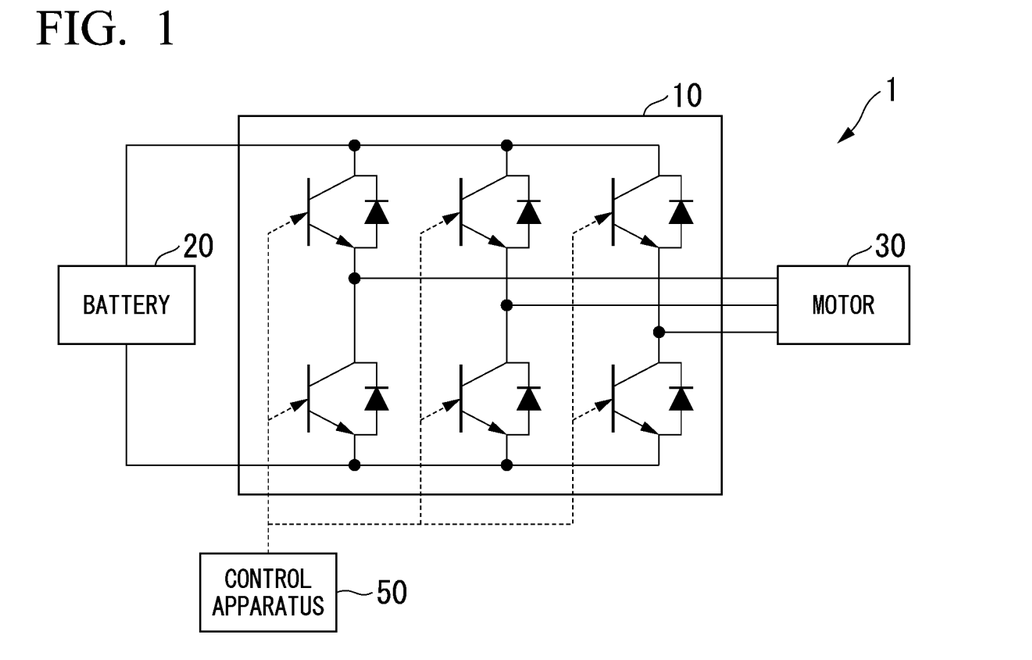
FIG. 1 is a view showing an example of a functional configuration of a vehicle control apparatus according to an embodiment of the present invention.

FIG. 1 is a view showing an example a functional configuration of a vehicle control apparatus 1 according to an embodiment of the present invention.

The vehicle control apparatus 1 of the present embodiment is mounted on an electric vehicle or the like. The electric vehicle includes a variety of vehicles such as an electric vehicle, a hybrid electric vehicle (HEV; Hybrid Electric Vehicle), and a fuel cell vehicle (FCV; Fuel Cell Vehicle). The electric vehicle is driven using a battery as a power source. The hybrid electric vehicle is driven using a battery and an internal combustion engine as a power source. The fuel cell vehicle is driven using a fuel cell as a drive source. In the following description, when the types of these vehicles are not distinguished, the vehicles are collectively referred to as an electric vehicle.

A drive scheme of the hybrid electric vehicle includes a parallel scheme, a series scheme (including a range extender scheme), a series/parallel scheme, and the like. The control apparatus of the present embodiment can be applied to the drive scheme described above and can also be mounted on vehicles of various drive schemes using an electric motor as a power source.

In the following description, the same reference numeral may be used for components having the same function, and descriptions thereof may be omitted.

[Functional Configuration of Vehicle Control Apparatus 1]

The vehicle control apparatus 1 includes a battery 20, an inverter 10, a motor 30, and a control apparatus 50.

The battery 20 is charged by an external electric power source in a state of being mounted on a vehicle. The battery 20 can also be charged by an external charger in a state of being removed from the vehicle. The battery 20 supplies electric power to the motor 30 and another in-vehicle equipment.

The motor 30 generates power (drive force) for traveling of the vehicle. The motor 30 is operable, for example, by using electric power output by the battery 20. The power of the motor 30 is transmitted to an axle (not shown) via a transmission (not shown). The motor 30 functions as a regeneration generator at a time of deceleration and braking of the vehicle and outputs the generated electric power to the battery 20. In an example, the motor 30 is a three-phase alternating current motor. In the following description, the motor 30 may be referred to as an electric motor.

The inverter 10 is electrically connected between the battery 20 and the motor 30. The inverter 10 drives the motor 30 by converting DC electric power output by the battery 20 into AC electric power and outputting the converted AC electric power to the motor 30. The inverter 10 charges the battery 20 by converting AC electric power output by the motor 30 into DC electric power and outputting the converted DC electric power to the battery 20.

Specifically, the inverter 10 controls whether or not a current flows into each phase of the motor 30 by controlling a connection state of a plurality of switching elements. The inverter 10 controls a direction of the current that flows into each phase of the motor 30.

More specifically, the switching element is a semiconductor switching element. As an example, the switching element is an IGBT (Insulated Gate Bipolar Transistor), a power MOS (Metal Oxide Semiconductor) transistor, a power bipolar transistor, and the like.

The inverter 10 may be included in a PDU (Power Drive Unit) (not shown).

The control apparatus 50 may be formed as a hardware function part that functions by an integrated circuit or the like, or may be formed as a software function part that functions by a predetermined program being executed by a processor such as a CPU (Central Processing Unit). The software function part is an ECU (Electronic Control Unit) that includes a processor such as a CPU, a ROM (Read Only Memory) that stores a program, a RAM (Random Access Memory) that temporarily stores data, and electronic circuitry such as a timer.

The control apparatus 50 acquires information regarding driving of the motor 30, such as a motor drive torque, a motor rotation number, and a DC voltage, and controls the inverter 10 on the basis of the acquired information.

Here, the inverter 10 supplies electric power to the motor. That is, the control apparatus 50 controls the inverter 10 that outputs electric power to the motor (electric motor). The control apparatus 50 drives a drive wheel included in the vehicle by controlling the inverter 10 in a vehicle system.

[Functional Configuration of Control Apparatus 50]

Figure 2:
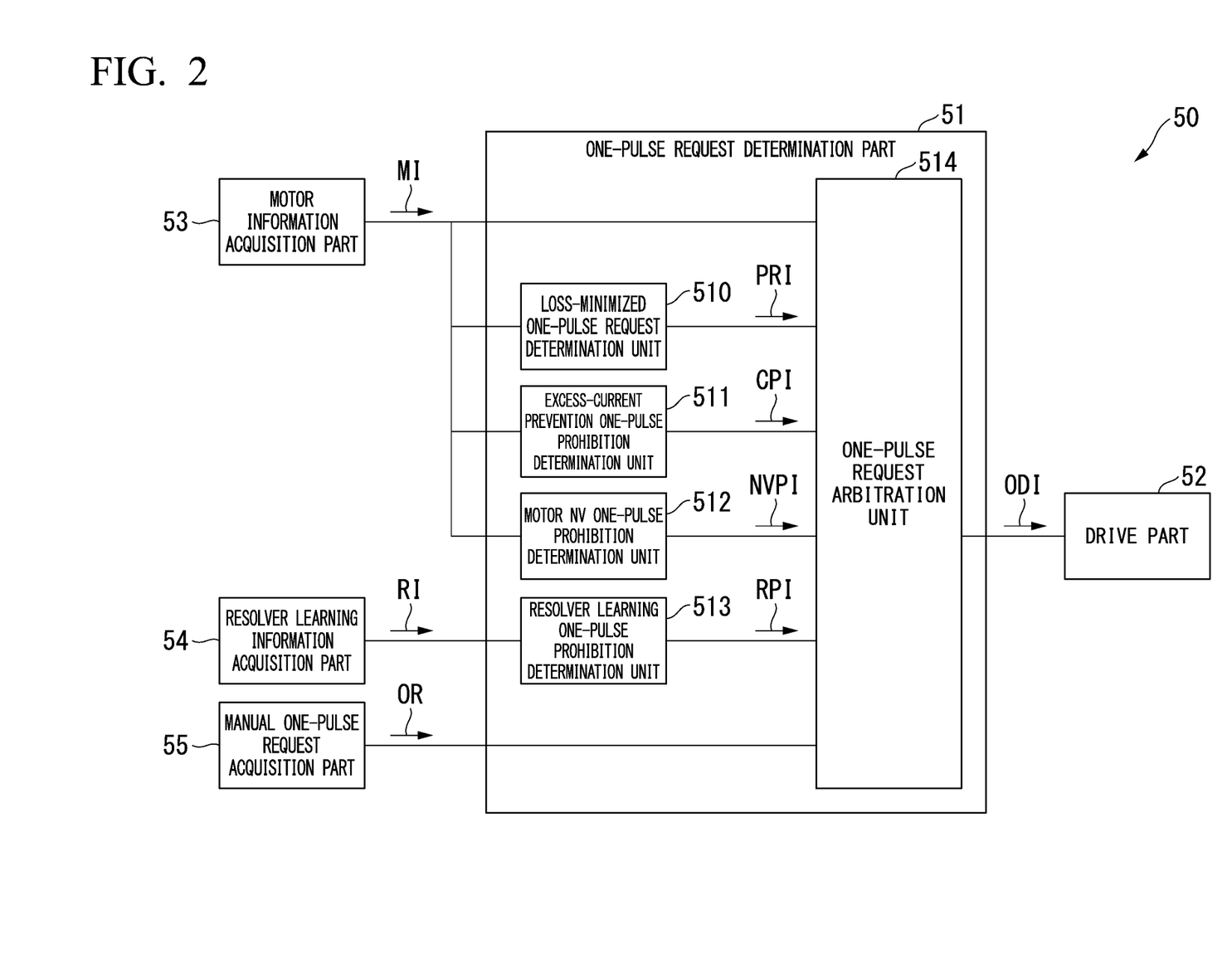
FIG. 2 is a view showing an example of a functional configuration of a control apparatus according to the embodiment of the present invention.

FIG. 2 is a view showing an example of a functional configuration of the control apparatus 50 according to the embodiment of the present invention.

The control apparatus 50 includes a one-pulse request determination part 51, a drive part 52, a motor information acquisition part 53, and a resolver learning information acquisition part 54.

The motor information acquisition part 53 acquires motor information MI from a current sensor (not shown), a voltage sensor (not shown), a rotation angle sensor (not shown) such as a resolver, and the like. The motor information MI acquired by the motor information acquisition part 53 may include information (for example, information of a drive torque calculated from a drive current value obtained from the current sensor) calculated from information obtained from the current sensor, the voltage sensor, the rotation angle sensor such as a resolver, and the like.

The motor information MI is information regarding a drive state of the motor 30. The motor information MI is, for example, a drive torque of the motor 30, a line voltage (DC voltage), a rotation angle, a rotation number, and the like.

The motor information acquisition part 53 provides the acquired motor information MI to the one-pulse request determination part 51.

The resolver learning information acquisition part 54 acquires resolver learning information RI from a non-volatile memory (not shown).

A resolver is a rotation angle sensor (phase sensor) that detects a rotation angle of the motor 30. The information of the rotation angle of the motor 30 detected by the resolver is used for calculating the rotation number of the motor 30 and the like.

The resolver learning information RI is information regarding learning of the resolver. The learning of the resolver is a calibration. Specifically, the learning of the resolver means storing of a correspondence relationship among a rotor reference angle of the motor 30, an output signal of the resolver, and an assembly angle. When the resolver is assembled to the motor 30, a displacement of an angle occurs. The learning of the resolver is performed when calibrating the assembly angle of the resolver relative to the rotor reference angle of the motor 30. In an example, information to be learned by the resolver is a relationship between a physical reference angle of the rotor and a phase angle of an output signal of the resolver. By performing the learning of the resolver, it is possible to calibrate the displacement of the angle.

For example, the learning of the resolver is performed at a time of a shipping inspection in a factory and at a time of a service at a dealer or a maintenance shop.

The non-volatile memory (not shown) stores learning information (a relationship between the physical reference angle of the rotor and the phase angle of the output signal of the resolver or the like) of the resolver as the resolver learning information RI. The resolver learning information RI may include information on whether the resolver has learned or has not learned. In the following description, the resolver learning information RI may also be referred to as sensor learning information.

The resolver learning information acquisition part 54 provides the resolver learning information RI to the one-pulse request determination part 51.

The one-pulse request determination part 51 includes a loss-minimized one-pulse request determination unit 510, an excess-current prevention one-pulse prohibition determination unit 511, a motor NV one-pulse prohibition determination unit 512, a resolver learning one-pulse prohibition determination unit 513, and a one-pulse request arbitration unit 514.

In an example, the one-pulse request determination part 51 determines whether or not a one-pulse control is performed on the basis of the motor information MI acquired from the motor information acquisition part 53 and the resolver learning information RI acquired from the resolver learning information acquisition part 54. The one-pulse request determination part 51 provides information on whether or not the one-pulse control is performed to the drive part 52 as one-pulse drive information ODI.

[One-Pulse Control and PWM Control]

Here, the one-pulse control and a PWM (Pulse Width Modulation) control are described.

Both the one-pulse control and the PWM control are control methods relating to driving of the motor 30. In an example, the one-pulse control is a method of driving the motor 30 by one pulse applied at a cycle similar to a switching cycle of a line voltage applied to the motor 30.

The PWM control is an example of a multi-pulse control. The multi-pulse control broadly includes motor control methods other than the one-pulse control.

Figure 3:
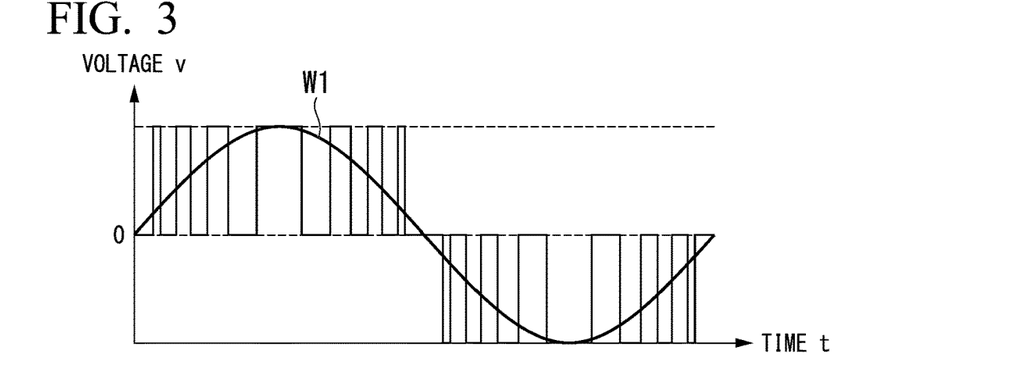
FIG. 3 is a view showing an example of a voltage waveform of a sinusoidal PWM control according to the embodiment of the present invention.

The PWM control includes a sinusoidal PWM control, an overmodulation PWM control, and the like. Both the sinusoidal PWM control and the overmodulation PWM control perform a control of the amplitude and the phase of the voltage applied to the motor 30 by a feedback control to the current of the motor 30. With reference to FIG. 3, the sinusoidal PWM control is described, and then, with reference to FIG. 4, the overmodulation PWM control is described.

FIG. 3 is a view showing an example of a voltage waveform of the sinusoidal PWM control according to the embodiment of the present invention. FIG. 3 shows a magnitude of a voltage according to one phase of the motor 30 using a horizontal axis as a time. In an example of FIG. 3, by changing a duty ratio of a pulse, an energy equivalent to that of a sinusoidal wave W1 is applied to the motor 30. That is, the sinusoidal PWM control is a control method that maintains a linearity between a voltage value and a PWM signal by performing a pulse-width modulation in a state where an amplitude of a voltage value of the sinusoidal wave W1 is equal to or less than an amplitude of a voltage applied between lines of the motor 30.

Figure 4:
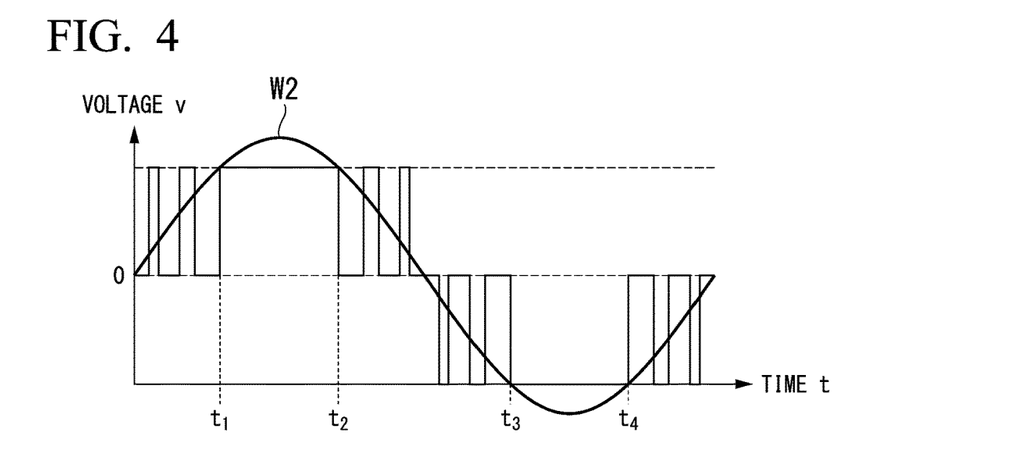
FIG. 4 is a view showing an example of a voltage waveform of an overmodulation PWM control according to the embodiment of the present invention.

FIG. 4 is a view showing an example of a voltage waveform of the overmodulation PWM control according to the embodiment of the present invention. FIG. 4 shows a magnitude of a voltage according to one phase of the motor 30 using a horizontal axis as a time.

The overmodulation PWM control permits a non-linearity between a voltage value and a PWM signal by performing a pulse-width modulation in a state where an amplitude of a voltage value of a sinusoidal wave W2 is larger than an amplitude of a voltage applied between lines of the motor 30. That is, the overmodulation PWM control is a control method in which a sinusoidal line voltage of the motor 30 is distorted so as to approach a rectangular waveform, and a voltage utilization ratio is increased compared to a case in which the line voltage has a sinusoidal waveform.

In an example of FIG. 4, a value of the sinusoidal wave W2 exceeds an actually applied voltage value in a period of time from a time $t_1$ to a time $t_2$ and a period of time from a time $t_3$ to a time $t_4$ (in the following description, also referred to as a non-linear period). That is, in the example of FIG. 4, the line voltage of the motor 30 approaches the rectangular waveform from the sinusoidal waveform, and the voltage utilization ratio is increased in the period of time from the time $t_1$ to the time $t_2$ and the period of time from the time $t_3$ to the time $t_4$.

Figure 5:
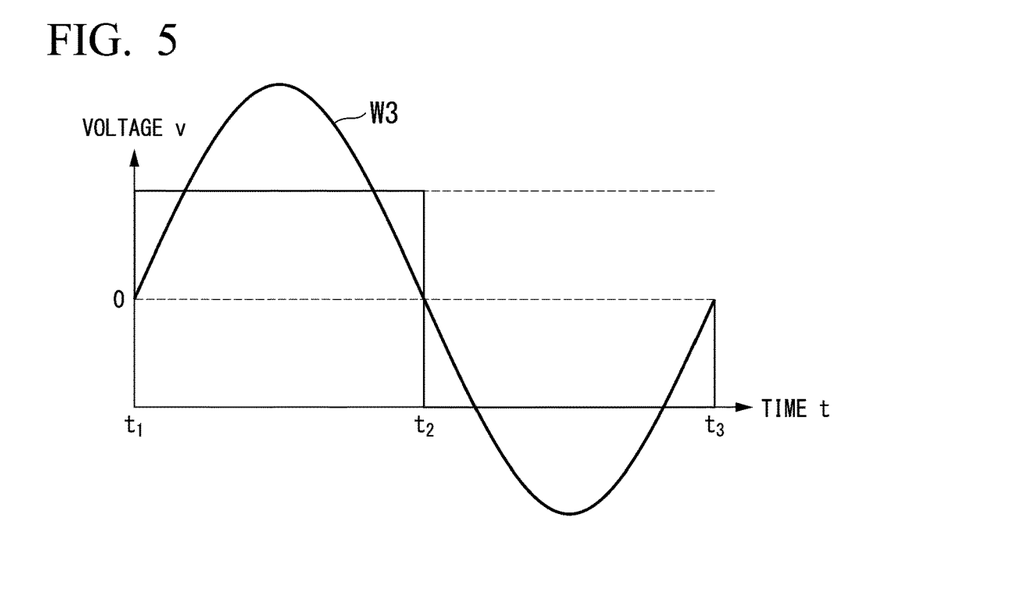
FIG. 5 is a view showing an example of a voltage waveform of a one-pulse control according to the embodiment of the present invention.

FIG. 5 is a view showing an example of a voltage waveform of the one-pulse control according to the embodiment of the present invention.

FIG. 5 shows a magnitude of a voltage according to one phase of the motor 30 using a horizontal axis as a time.

In the one-pulse control, switching is performed twice in one cycle. In an example of FIG. 5, switching is performed only at two time points which are a time $t_1$ and a time $t_2$ in one cycle from the time $t_1$ to a time $t_3$ that is the same cycle as a cycle of a sinusoidal wave W3. According to the one-pulse control, the voltage utilization ratio is further increased compared to the sinusoidal PWM control and the overmodulation PWM control.

The PWM control (for example, the sinusoidal PWM control or the overmodulation PWM control) controls the amount of energy given to the motor 30 by switching. In the sinusoidal PWM control, switching is performed in order to maintain the linearity between the voltage value and the PWM signal. In the overmodulation PWM control, switching is not performed in the non-linear period, but switching is performed in order to maintain the linearity between the voltage value and the PWM signal other than in the non-linear period. Accordingly, when comparing the number of switching times of the sinusoidal PWM control with the number of switching times of the overmodulation PWM control, the number of switching times of the overmodulation PWM control is smaller.

On the other hand, in the one-pulse control, switching is performed only twice in one cycle. Accordingly, the number of switching times of the one-pulse control is smaller compared to the number of switching times of the sinusoidal PWM control and the number of switching times of the overmodulation PWM control.

In this way, the one-pulse control reduces the number of switching times compared to the PWM control (for example, the sinusoidal PWM control or the overmodulation PWM control). Accordingly, the one-pulse control can reduce electric power loss due to switching compared to the PWM control.

With reference back to FIG. 1, configuration elements included in the one-pulse request determination part 51 are described.

The loss-minimized one-pulse request determination unit 510 acquires motor information MI from the motor information acquisition part 53. The loss-minimized one-pulse request determination unit 510 calculates a drive efficiency on the basis of the acquired motor information MI. The loss-minimized one-pulse request determination unit 510 determines whether or not the one-pulse control is performed on the basis of the calculated drive efficiency.

As described above, the motor information MI includes the electric motor drive torque (drive torque of the motor 30), and the rotation number and the DC voltage of the electric motor (motor 30). That is, the loss-minimized one-pulse request determination unit 510 calculates the drive efficiency on the basis of the electric motor drive torque (drive torque of the motor 30) and the rotation number and the DC voltage of the electric motor (motor 30) and uses the drive efficiency for a predetermined condition.

The loss-minimized one-pulse request determination unit 510 provides loss-minimized one-pulse request information PRI which is information indicating whether or not the one-pulse drive is performed to the one-pulse request arbitration unit 514.

The excess-current prevention one-pulse prohibition determination unit 511 acquires motor information MI from the motor information acquisition part 53. The excess-current prevention one-pulse prohibition determination unit 511 calculates a value of a current that flows into the motor 30 when the one-pulse control is performed on the basis of the acquired motor information MI. The excess-current prevention one-pulse prohibition determination unit 511 determines whether or not the current becomes an excess current on the basis of the value of the current that flows into the motor 30.

That is, the excess-current prevention one-pulse prohibition determination unit 511 calculates a current value at a time of the one-pulse control on the basis of the electric motor drive torque (drive torque of the motor 30) and the rotation number and the DC voltage of the electric motor (motor 30) and thereby uses the current value for a predetermined condition.

The excess-current prevention one-pulse prohibition determination unit 511 provides excess-current prevention one-pulse prohibition information CPI which is information indicating whether or not the one-pulse drive is prohibited to the one-pulse request arbitration unit 514.

In an example, the excess-current prevention one-pulse prohibition determination unit 511 determines whether or not the one-pulse control is prohibited on the basis of the value of the current that flows into the motor 30 when the one-pulse control is performed; however, the embodiment is not limited to the example. For example, the excess-current prevention one-pulse prohibition determination unit 511 may be an excess-voltage prevention one-pulse prohibition determination unit (not shown).

The excess-voltage prevention one-pulse prohibition determination unit calculates a voltage generated between the lines of the motor 30 when the one-pulse control is performed. The excess-voltage prevention one-pulse prohibition determination unit determines whether or not the voltage becomes an excess voltage on the basis of the voltage applied to the motor 30. When it is determined that the voltage becomes an excess voltage, the excess-voltage prevention one-pulse prohibition determination unit provides information indicating whether or not the one-pulse drive is prohibited to the one-pulse request arbitration unit 514.

The generation of the excess voltage may be prevented by forming the excess-voltage prevention one-pulse prohibition determination unit in this way.

The motor NV one-pulse prohibition determination unit 512 acquires motor information MI from the motor information acquisition part 53. The motor NV one-pulse prohibition determination unit 512 calculates a NV level of the motor 30 when the one-pulse control is performed on the basis of the acquired motor information MI. The NV level of the motor 30 is a measure indicating a magnitude of noise or vibration generated by the driving of the motor 30. The motor NV one-pulse prohibition determination unit 512 determines whether or not the one-pulse control is performed on the basis of the calculated NV level.

That is, the motor NV one-pulse prohibition determination unit 512 calculates a noise value at a time of the one-pulse control on the basis of the electric motor drive torque (drive torque of the motor 30) and the rotation number and the DC voltage of the electric motor (motor 30) and thereby uses the noise value for a predetermined condition.

The motor NV one-pulse prohibition determination unit 512 provides motor NV one-pulse prohibition information NVPI which is information indicating whether or not the one-pulse drive is prohibited to the one-pulse request arbitration unit 514.

The resolver learning one-pulse prohibition determination unit 513 acquires resolver learning information RI from the resolver learning information acquisition part 54. The resolver learning one-pulse prohibition determination unit 513 determines whether or not the one-pulse control is performed on the basis of the acquired resolver learning information RI.

That is, the resolver learning one-pulse prohibition determination unit 513 determines whether phase sensor error information is calculable on the basis of the resolver learning information RI and uses the phase sensor error information for a second predetermined condition.

The resolver learning one-pulse prohibition determination unit 513 provides resolver learning one-pulse prohibition information RPI which is information indicating whether or not the one-pulse drive is prohibited to the one-pulse request arbitration unit 514.

The one-pulse request arbitration unit 514 acquires the loss-minimized one-pulse request information PRI from the one-pulse request determination part 51, acquires the excess-current prevention one-pulse prohibition information CPI from the excess-current prevention one-pulse prohibition determination unit 511, acquires the motor NV one-pulse prohibition information NVPI from the motor NV one-pulse prohibition determination unit 512, and acquires the resolver learning one-pulse prohibition information RPI from the resolver learning one-pulse prohibition determination unit 513. The one-pulse request arbitration unit 514 determines whether or not the one-pulse control is performed on the basis of the acquired information. The one-pulse request arbitration unit 514 provides information on whether or not the one-pulse control is performed as one-pulse drive information ODI to the drive part 52.

The drive part 52 acquires the one-pulse drive information ODI from the one-pulse request determination part 51.

The drive part 52 drives the motor 30 on the basis of the information indicated by the one-pulse drive information ODI. Specifically, the drive part 52 drives a switching element included in the inverter 10.

When the one-pulse drive information ODI indicates the one-pulse control, the drive part 52 drives the motor 30 under the one-pulse control. That is, the drive part 52 drives the motor 30 under the one-pulse control in accordance with the predetermined condition based on the electric motor drive torque, the rotation number of the electric motor, and the DC voltage of the electric motor.

When the one-pulse drive information ODI does not indicate the one-pulse control, the drive part 52 drives the motor 30 under a control (multi-pulse control such as the PWM control) other than the one-pulse control.

That is, the drive part 52 determines which one of the one-pulse control and the pulse-width modulation control is employed as a control method of the inverter that drives the motor 30 on the basis of the information indicated by the one-pulse drive information ODI.

The control apparatus 50 may include a manual one-pulse request acquisition part 55.

The manual one-pulse request acquisition part 55 acquires a manual one-pulse request OR from a vehicle control ECU (not shown). In an example, the manual one-pulse request OR is a request that causes the drive part 52 to perform the one-pulse control regardless of a determination based on the information acquired by the one-pulse request arbitration unit 514. The manual one-pulse request acquisition part 55 provides the manual one-pulse request OR to the one-pulse request arbitration unit 514.

The one-pulse request determination part 51 may have a configuration in which the one-pulse request arbitration unit 514 acquires the motor information MI from the motor information acquisition part 53. When the one-pulse request arbitration unit 514 acquires the motor information MI from the motor information acquisition part 53, the one-pulse request arbitration unit 514 can determine whether or not the one-pulse control is performed on the basis of the motor information MI.

[Operation of Control Apparatus 50]

Figure 6:
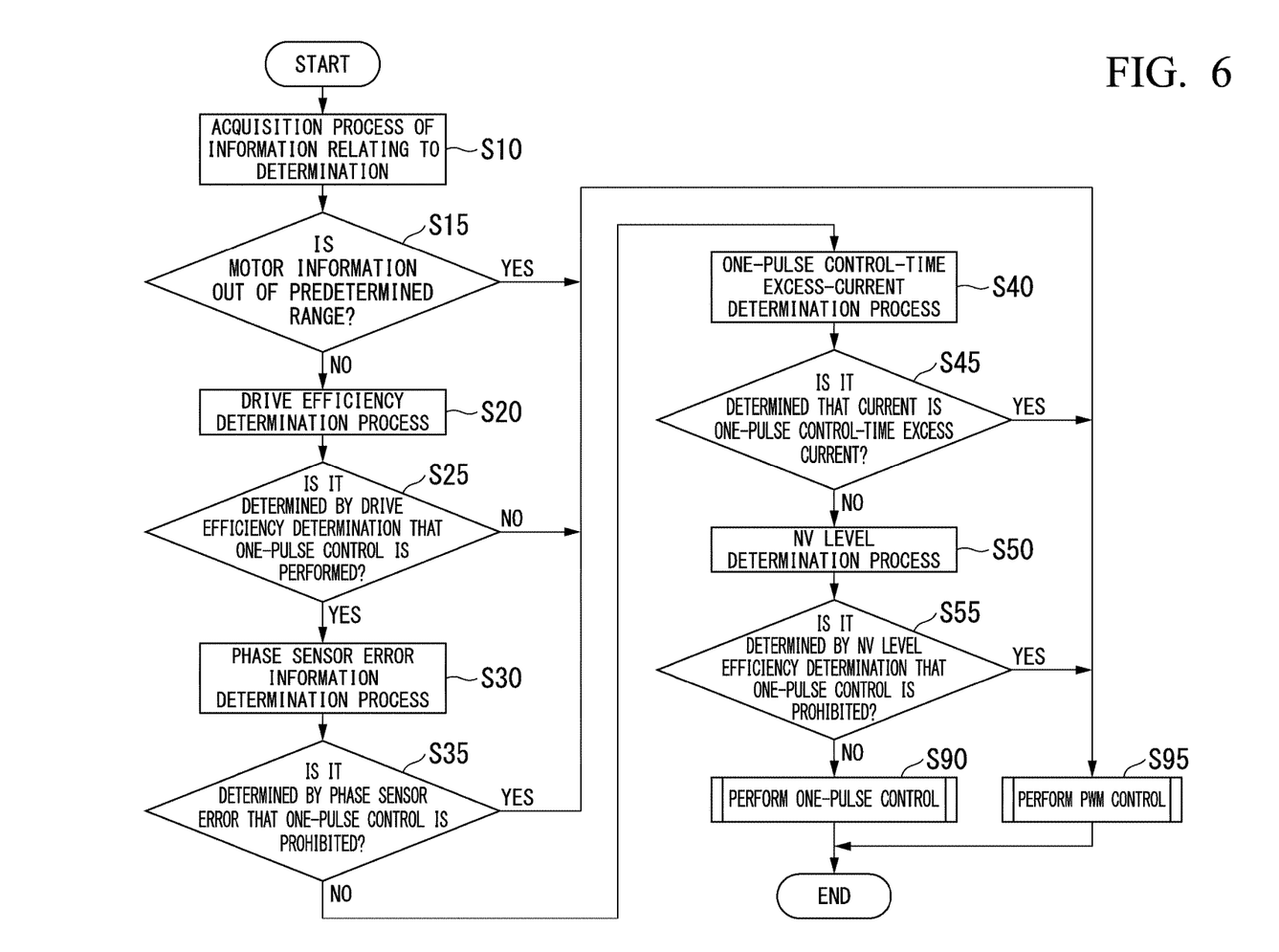
FIG. 6 is a view showing an example of a series of operations of a one-pulse drive determination by a one-pulse request determination part according to the embodiment of the present invention.

FIG. 6 is a view showing an example of a series of operations of a one-pulse drive determination by the one-pulse request determination part 51 according to the embodiment of the present invention.

(Step S10) The one-pulse request determination part 51 performs an acquisition process of information relating to the determination.

Specifically, the loss-minimized one-pulse request determination unit 510, the excess-current prevention one-pulse prohibition determination unit 511, and the motor NV one-pulse prohibition determination unit 512 acquire the motor information MI from the motor information acquisition part 53. The resolver learning one-pulse prohibition determination unit 513 acquires the resolver learning information RI from the resolver learning information acquisition part 54. The one-pulse request arbitration unit 514 acquires the motor information MI from the motor information acquisition part 53. The one-pulse request arbitration unit 514 advances the process to Step S15.

(Step S15) The one-pulse request arbitration unit 514 determines, on the basis of the information shown in the motor information MI, whether or not each information is within a predetermined value range. For example, when the value of the motor information MI is an abnormal value, there is a possibility of a sensor failure or the like. Accordingly, the one-pulse request determination part 51 performs the PWM control regardless of a determination process on whether or not the one-pulse control is performed described later. That is, when the motor information MI is out of the predetermined range (Step S15; YES), the one-pulse request arbitration unit 514 advances the process to Step S95. When the motor information MI is within the predetermined range (Step S15; NO), the one-pulse request arbitration unit 514 advances the process to Step S20.

(Step S20) The loss-minimized one-pulse request determination unit 510 performs a drive efficiency determination process on the basis of the acquired motor information MI. The drive efficiency determination process is a process of comparing an efficiency when the one-pulse control is performed and an efficiency when the PWM control is performed with each other and determining whether or not the one pulse control is performed.

For example, the loss-minimized one-pulse request determination unit 510 selects a control method having a smaller loss. The loss-minimized one-pulse request determination unit 510 advances the process to Step S25.

(Step S25) The loss-minimized one-pulse request determination unit 510 provides, as loss-minimized one-pulse request information PRI, information on whether or not the one-pulse control is performed which is determined by the drive efficiency determination process to the one-pulse request arbitration unit 514. When it is determined by the drive efficiency determination process that the one-pulse control is performed (Step S25; YES), the loss-minimized one-pulse request determination unit 510 advances the process to Step S30. When it is determined by the drive efficiency determination process that the one-pulse control is not performed (Step S25; NO), the loss-minimized one-pulse request determination unit 510 advances the process to Step S95.

(Step S30) The resolver learning one-pulse prohibition determination unit 513 performs a phase sensor error information determination process on the basis of the acquired resolver learning information RI. The phase sensor error information determination process determines whether or not the one-pulse control is prohibited on the basis of the information indicated by the resolver learning information RI. As an example, the phase sensor error information determination process determines whether or not the one-pulse control is prohibited on the basis of information on whether the resolver has learned or has not learned. In this case, for example, the resolver learning one-pulse prohibition determination unit 513 can prohibit the one-pulse control when the resolver has not learned.

(Step S35) The resolver learning one-pulse prohibition determination unit 513 provides, as resolver learning information RI, information on whether or not the one-pulse control is prohibited which is determined by the phase sensor error information determination process to the one-pulse request arbitration unit 514. When it is determined by the phase sensor error information determination process that the one-pulse control is prohibited (Step S35; YES), the resolver learning one-pulse prohibition determination unit 513 advances the process to Step S95. When it is determined by the phase sensor error information determination process that the one-pulse control is not prohibited (Step S35; NO), the resolver learning one-pulse prohibition determination unit 513 advances the process to Step S40.

(Step S40) The excess-current prevention one-pulse prohibition determination unit 511 performs a one-pulse control-time excess-current determination process on the basis of the acquired motor information MI. The one-pulse control-time excess-current determination process is a process of calculating a current value when the one-pulse control is performed on the basis of the information indicated by the motor information MI and determining whether or not an excess current flows at a time of the one-pulse control. As an example, in a case where the calculated current value when the one-pulse control is performed is equal to or more than a predetermined value, the excess-current prevention one-pulse prohibition determination unit 511 determines that the current is a one-pulse control-time excess current.

(Step S45) The excess-current prevention one-pulse prohibition determination unit 511 provides, as excess-current prevention one-pulse prohibition information CPI, information on whether or not the current is a one-pulse control-time excess current which is determined by the one-pulse control-time excess current determination process to the one-pulse request arbitration unit 514. When it is determined by the one-pulse control-time excess current determination process that the current is the one-pulse control-time excess current (Step S45; YES), the excess-current prevention one-pulse prohibition determination unit 511 advances the process to Step S95. When it is determined by the one-pulse control-time excess current determination process that the current is not the one-pulse control-time excess current (Step S45;

NO), the excess-current prevention one-pulse prohibition determination unit 511 advances the process to Step S50.

(Step S50) The motor NV one-pulse prohibition determination unit 512 performs a NV level determination process on the basis of the acquired motor information MI. The NV level determination process is a process of calculating a NV level when the one-pulse control is used and determining whether or not the one-pulse control is prohibited on the basis of the calculated NV level. As an example, when the calculated NV level is equal to or more than a predetermined value, the motor NV one-pulse prohibition determination unit 512 determines that one-pulse control is prohibited.

(Step S55) The motor NV one-pulse prohibition determination unit 512 provides, as motor NV one-pulse prohibition information NVPI, information on whether or not the one-pulse control is prohibited which is determined by the NV level determination process to the one-pulse request arbitration unit 514. When it is determined by the NV level determination process that the one-pulse control is prohibited (Step S55; YES), the motor NV one-pulse prohibition determination unit 512 advances the process to Step S95. When it is determined by the NV level determination process that the one-pulse control is not prohibited (Step S55; NO), the motor NV one-pulse prohibition determination unit 512 advances the process to Step S90.

(Step S90) The one-pulse request arbitration unit 514 provides information indicating that the one-pulse control is performed as one-pulse drive information ODI to the drive part 52.

When the one-pulse drive information ODI is acquired from the one-pulse request arbitration unit 514, the drive part 52 drives the motor 30 on the basis of the information indicated in the one-pulse drive information ODI. In this case, since the one-pulse drive information ODI includes the information indicating that the one-pulse control is performed, the drive part 52 drives the motor 30 under the one-pulse control. The drive part 52 terminates the process when the motor 30 is driven under the one-pulse control.

(Step S95) The one-pulse request arbitration unit 514 provides information indicating that the PWM control is performed as one-pulse drive information ODI to the drive part 52.

When the one-pulse drive information ODI is acquired from the one-pulse request arbitration unit 514, the drive part 52 drives the motor 30 on the basis of the information indicated in the one-pulse drive information ODI. In this case, since the one-pulse drive information ODI includes the information indicating that the PWM control is performed, the drive part 52 drives the motor 30 under the PWM control. The drive part 52 terminates the process when the motor 30 is driven under the PWM control.

Hereinbefore, an example of a series of operations of the control apparatus 50 is described. The order of the determination by the one-pulse request determination part 51 is an actually performed order. That is, the one-pulse request determination part 51 performs the determination by the loss-minimized one-pulse request determination unit 510, performs the determination by the resolver learning one-pulse prohibition determination unit 513, performs the determination by the excess-current prevention one-pulse prohibition determination unit 511, and performs the determination by the motor NV one-pulse prohibition determination unit 512.

The order of the determinations performed by the one-pulse request determination part 51 is not limited to this example. The motor NV one-pulse prohibition determination unit 512 may perform the determinations in any order.

In the above-described embodiment, the order in which the determinations are performed is shown. However, the embodiment is not limited to this example. The determinations performed by the one-pulse request determination part 51 may be performed simultaneously or may be performed independently from one another.

With respect to the determinations performed by the one-pulse request determination part 51, it is sufficient that at least one determination is performed, and it is not necessary to perform all of the determinations.

Summary of Advantage of Embodiment

As described above using the embodiment, the control apparatus 50 includes the motor information acquisition part 53, the resolver learning information acquisition part 54, the one-pulse request determination part 51, and the drive part 52. The one-pulse request determination part 51 determines whether or not the one-pulse control is performed on the basis of the information acquired from the motor information acquisition part 53 and the resolver learning information acquisition part 54. The one-pulse request determination part 51 causes the drive part 52 to drive the motor 30 on the basis of the determined result.

According to the control apparatus 50 of the present embodiment, the one-pulse request arbitration unit 514 determines whether or not the one-pulse control is performed in accordance with the predetermined condition on the basis of the motor information MI acquired from the motor information acquisition part 53.

The control apparatus 50 performs the one-pulse control when satisfying a predetermined condition set on each of an efficiency, the heat, the ride comfort, and the NV on the basis of the motor drive torque, the motor rotation number, and the DC voltage. The control apparatus 50 performs the PWM drive when the predetermined condition is not satisfied.

Accordingly, the control apparatus 50 can perform a motor control that satisfies all of the efficiency, the comfort, and electric power costs.

According to the control apparatus 50 of the present embodiment, the one-pulse request determination part 51 includes the resolver learning one-pulse prohibition determination unit 513. The resolver learning one-pulse prohibition determination unit 513 determines whether or not the phase sensor error information determination process is performable on the basis of the resolver learning information RI and performs the phase sensor error information determination process.

In a state where the resolver has not learned, the displacement between the physical reference angle of the rotor included in the motor 30 and the phase angle of the output signal of the resolver is large. When the control apparatus 50 performs the one-pulse control in a state where the resolver has not learned, the displacement of control becomes large due to the displacement between the reference angle of the rotor and the phase angle of the output signal of the resolver. That is, by performing the one-pulse control in a state where the resolver has not learned, the merchantability may deteriorate. Accordingly, the control apparatus 50 determines whether it is possible to calculate the error of the phase sensor by determining the learning state of a resolver sensor, and does not perform a selection that deteriorates the merchantability.

According to the control apparatus 50 of the present embodiment, the resolver learning one-pulse prohibition determination unit 513 determines whether or not the one-pulse control drive is selected on the basis of the information on whether the resolver has learned or has not learned which is indicated by the resolver learning information RI.

When the one-pulse control is performed in a state where the resolver has not learned, the merchantability may deteriorate due to an error of control.

Accordingly, the control apparatus 50 can prevent deterioration of the merchantability by determining whether or not the one-pulse control drive is selected on the basis of the resolver learning information RI.

According to the control apparatus 50 of the present embodiment, the one-pulse request determination part 51 includes the loss-minimized one-pulse request determination unit 510. The loss-minimized one-pulse request determination unit 510 calculates a drive efficiency from the motor information MI. The loss-minimized one-pulse request determination unit 510 compares an efficiency of performing the one-pulse control with an efficiency of performing the PWM control by calculating the drive efficiency. The loss-minimized one-pulse request determination unit 510 compares the one-pulse control with the PWM control and selects a control method having a better drive efficiency.

Accordingly, the control apparatus 50 can select a control method that consumes less electric power.

According to the control apparatus 50 of the present embodiment, the one-pulse request determination part 51 includes the excess-current prevention one-pulse prohibition determination unit 511. The excess-current prevention one-pulse prohibition determination unit 511 calculates a current value when the one-pulse control is performed from the motor information MI. The excess-current prevention one-pulse prohibition determination unit 511 prohibits the one-pulse control in a case where the current value when the one-pulse control is performed is equal to or more than a predetermined value.

Accordingly, the control apparatus 50 can prevent occurrence of the excess current or the excess voltage due to the one-pulse control.

According to the control apparatus 50 of the present embodiment, the one-pulse request determination part 51 includes the motor NV one-pulse prohibition determination unit 512. The motor NV one-pulse prohibition determination unit 512 calculates the NV level when the one-pulse control is performed from the motor information MI. The motor NV one-pulse prohibition determination unit 512 prohibits the one-pulse control in a case where the NV level when the one-pulse control is performed is equal to or more than a predetermined value.

The control apparatus 50 predicts in advance a case where the NV level deteriorates due to the one-pulse control and does not perform the one-pulse control when the NV level deteriorates. Accordingly, the control apparatus 50 can reduce the NV level to a certain level or less.

The control apparatus 50 can perform a low-noise and low-vibration motor drive by controlling the NV level to the certain level or less. That is, the vehicle can provide a low-noise and low-vibration vehicle by including the control apparatus 50.

Although the embodiment of the present invention has been described with reference to the drawings, the present invention is not limited in to such an embodiment, and various modifications and substitutions can be made without departing from the scope of the present invention.

What is claimed is:

1. A control apparatus that controls an inverter which outputs electric power to an electric motor,
wherein the control apparatus determines which one of a one-pulse control and a pulse-width modulation control is employed as a control method of the inverter in accordance with a predetermined condition based on an electric motor drive torque of the electric motor, a rotation number of the electric motor, and a DC voltage of the electric motor that are obtained from a current sensor, a voltage sensor, and a rotation angle sensor,
the control apparatus determines whether phase sensor error information is calculable based on sensor learning information that specifies a relationship between a physical reference angle of a rotor of the electric motor and a phase angle of an output signal of the rotation angle sensor attached to the electric motor, and
the control apparatus determines which one of the one-pulse control and the pulse-width modulation control is employed in accordance with the predetermined condition in a case where it is determined that the phase sensor error information is calculable.

2. The control apparatus according to claim 1,
wherein the control apparatus calculates a drive efficiency based on the electric motor drive torque, the rotation number, and the DC voltage and uses the drive efficiency for the predetermined condition.

3. The control apparatus according to claim 1,
wherein the control apparatus calculates a current value at a time of the one-pulse control based on the electric motor drive torque, the rotation number, and the DC voltage and uses the current value for the predetermined condition.

4. The control apparatus according to claim 1,
wherein the control apparatus calculates a noise value at a time of the one-pulse control based on the electric motor drive torque, the rotation number, and the DC voltage and uses the noise value for the predetermined condition.

5. A vehicle system comprising:
the control apparatus according to claim 1; and
a drive wheel that is driven by the control apparatus.

6. The control apparatus according to claim 1,
wherein after determining that the phase sensor error information is calculable,
a one-pulse control-time excess-current determination of determining whether or not an excess current flows at a time of the one-pulse control, and a NV level determination of determining whether or not the one-pulse control is prohibited based on a NV level at a time of the one-pulse control are performed.

7. The control apparatus according to claim 2,
wherein after determining that the phase sensor error information is calculable,
a one-pulse control-time excess-current determination of determining whether or not an excess current flows at a time of the one-pulse control, and a NV level determination of determining whether or not the one-pulse control is prohibited based on a NV level at a time of the one-pulse control are performed.

8. The control apparatus according to claim 6,
wherein the one-pulse control-time excess-current determination is performed in priority to the NV level determination.

9. The control apparatus according to claim 7,
wherein the one-pulse control-time excess-current determination is performed in priority to the NV level determination.

10. A control method including:

controlling an inverter which outputs electric power to an electric motor;

obtaining an electric motor drive torque of the electric motor, a rotation number of the electric motor, and a DC voltage of the electric motor by way of a current sensor, a voltage sensor, and a rotation angle sensor;

determining which one of a one-pulse control and a pulse-width modulation control is employed as a control method of the inverter in accordance with a predetermined condition based on the electric motor drive torque of the electric motor, the rotation number of the electric motor, and the DC voltage of the electric motor;

determining whether phase sensor error information is calculable based on sensor learning information that specifies a relationship between a physical reference angle of a rotor of the electric motor and a phase angle of an output signal of the rotation angle sensor attached to the electric motor; and determining which one of the one-pulse control and the pulse-width modulation control is employed in accordance with the predetermined condition in a case where it is determined that the phase sensor error information is calculable.

* * * * *